United States Patent [19]

Van Staveren

[11] 3,845,743

[45] Nov. 5, 1974

[54] ELASTICALLY DEFORMABLE HOSE AND A TEAT CUP PROVIDED WITH A LINING IN CONFORMITY WITH THIS HOSE

[76] Inventor: Nicolaas Arie Van Staveren, Maasdijk 82, Nederhemert-Noord, Netherlands

[22] Filed: June 28, 1973

[21] Appl. No.: 374,344

[30] Foreign Application Priority Data
June 30, 1972 Netherlands...................... 7209111

[52] U.S. Cl............................ 119/14.31, 119/14.52
[51] Int. Cl. ............................................. A01j 05/12
[58] Field of Search............ 119/14.31, 14.47–14.55

[56] References Cited
UNITED STATES PATENTS

| | | | |
|---|---|---|---|
| 904,564 | 11/1908 | Ripczinske...................... | 119/14.52 |
| 1,044,246 | 11/1912 | Reid................................ | 119/14.31 |

Primary Examiner—Hugh R. Chamblee
Attorney, Agent, or Firm—James E. Nilles

[57] ABSTRACT

A hose of deformable material such as rubber or canvas having a number of axially spaced pairs of opposite bellows arranged along the outer wall of the hose, together with a source of pressure variations and control means for obtaining cyclic expansions followed by collapses of the bellows so as to realize a peristaltic deformation of the hose.

6 Claims, 13 Drawing Figures

PATENTED NOV 5 1974 3,845,743

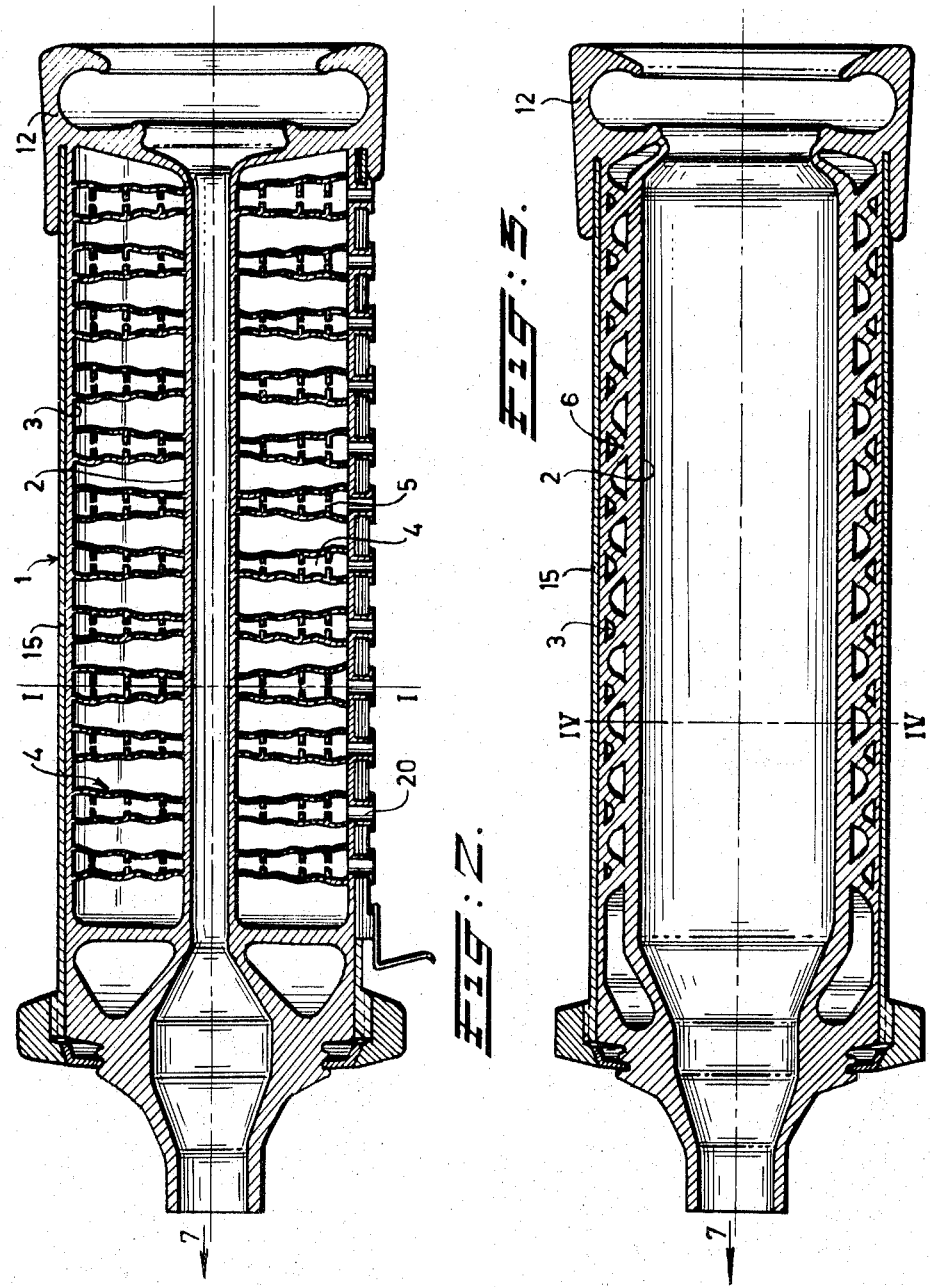

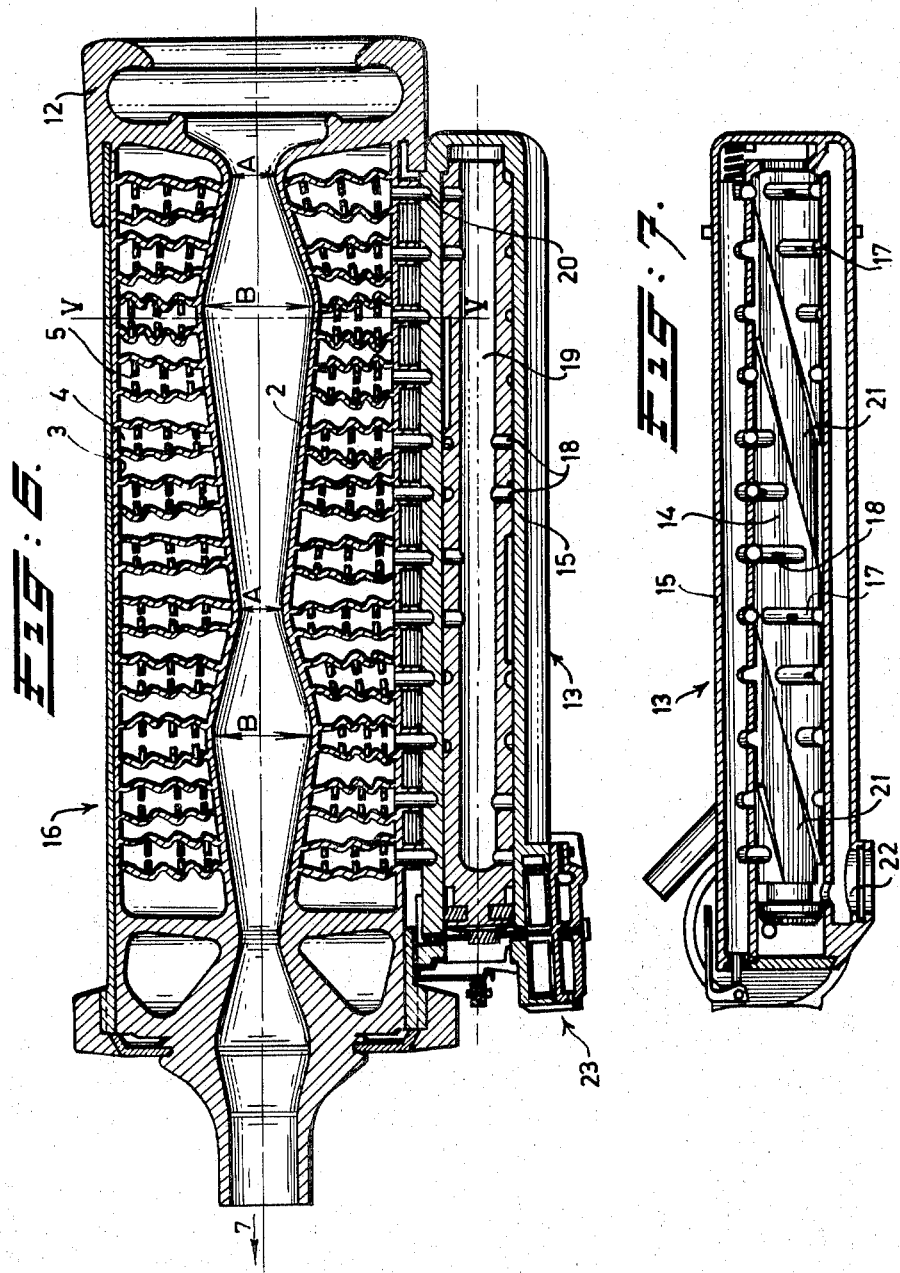

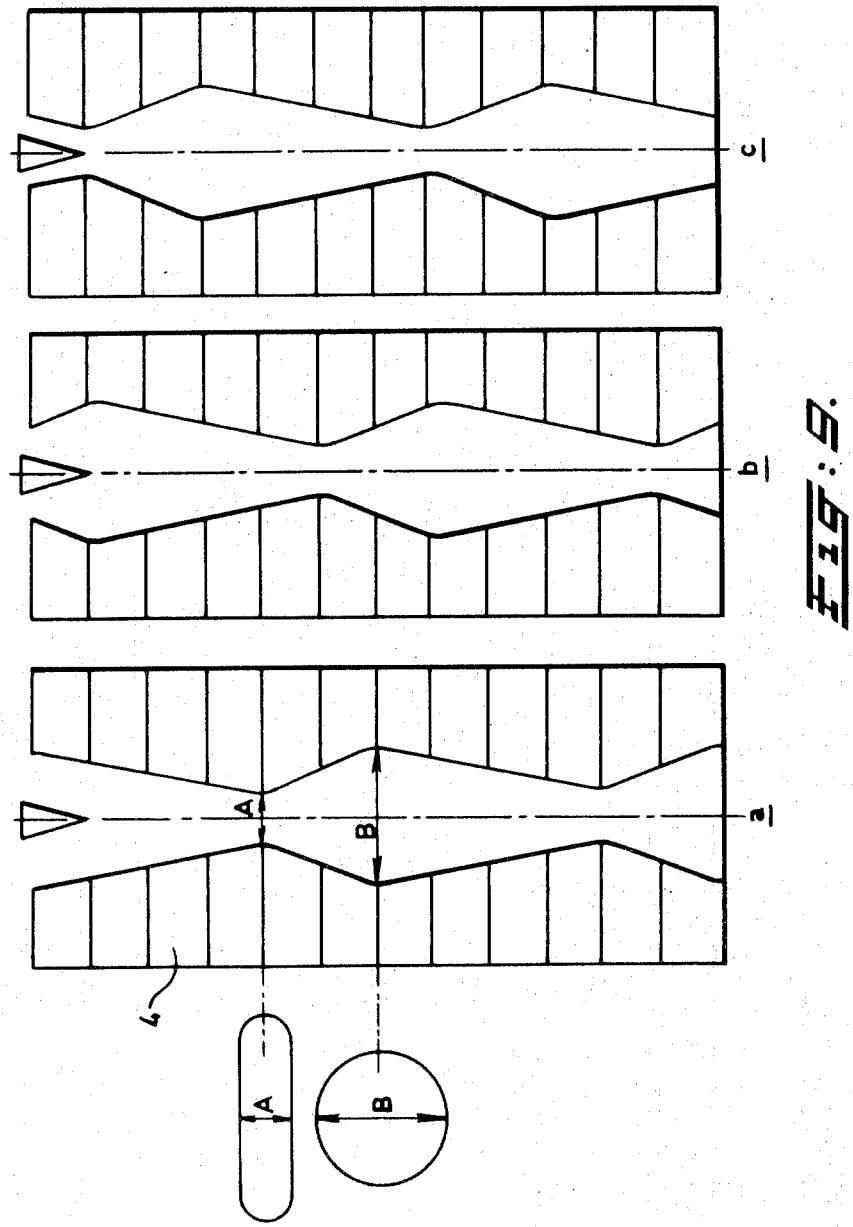

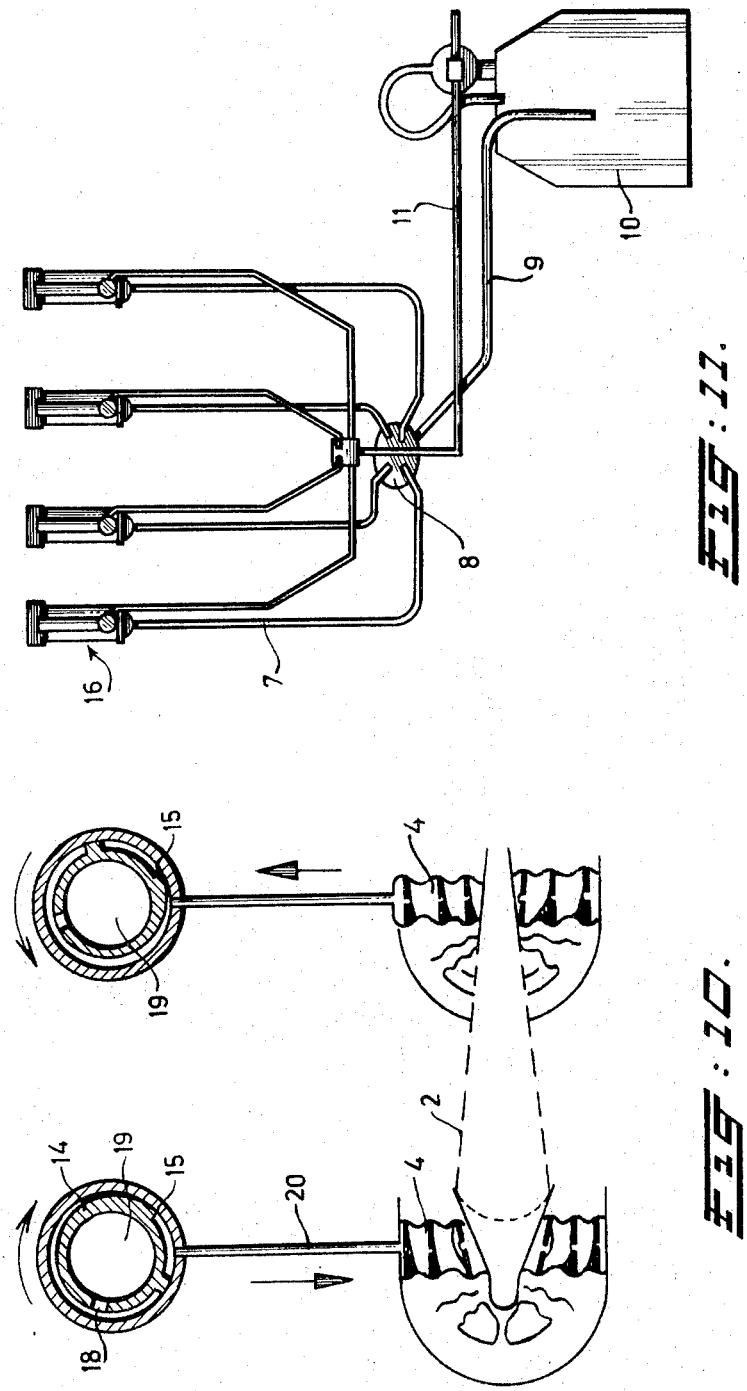

ELASTICALLY DEFORMABLE HOSE AND A TEAT CUP PROVIDED WITH A LINING IN CONFORMITY WITH THIS HOSE

BACKGROUND OF THE INVENTION

My invention relates to a hose of elastically deformable material provided with force exerting members arranged all round the hose and axially spaced for achieving a longitudinally progressive contraction followed by expansion. Such a hose can be used for transmitting a medium which is pressed forward by deformations produced in the hose.

It is a first object of my invention to provide a suitable construction of the force exerting members in such a way that the hose isstiffened to the least possible extent, in other words the entire hose structure remains as flexible as possible in spite of the aforementioned members.

SUMMARY OF THE INVENTION

The force exerting members of the hose consist of bellows connected with the hose, regulating means being provided capable of connecting the bellows with a source of vacuum or with the atmosphere. Since the bellows can be made of a flexible material the whole structure remains deformable.

My invention relates particularly to a hose which is destined for a lining in a teat cup for a pneumatic milking device. Such an application is important since due to the longitudinally progressive contraction the milking operation which is normally performed by hand can be automatized. For that purpose the hose is distinguished in that the inner wall is of a narrow rounded rectangular cross section and in that the bellows are constructed from sectors disposed on the outer wall of the long sides of the rectangle.

When the bellows are connected with a source of vacuum they will collapse and the narrow rectangle will be "drawn apart," so that the cross section is about circular. This situation corresponds with the aimed expansion of the hose, while the relaxed shape (narrow rectangle) represents the contraction. This styling allows the hose to be used advantageously as a lining in a teat cup, because in the contracted condition the flattened tissue of the teat can escape in the direction of the long sides of the rectangular cross section of the hose. The effect aimed at of milking viz. closing the milk channel by pressure is obtained in the most natural way.

My invention relates further to a teat cup provided with a lining in conformity with the hose just described. This teat cup is distinguished in that the hose is double-walled with a cylindrical outer wall and a rectangular inner wall, while the inner wall is connected along the short sides of the rectangle with the outer wall and the bellows are disposed between the inner and outer wall.

SURVEY OF THE DRAWINGS

FIG. 5 is a section on the line V—V in FIG. 6;

FIG. 6 is a section according to FIG. 2 of a complete teat cup provided with a regulating member in operation;

FIG. 7 shows a sectional view of the regulating member in a direction perpendicular to the plane of the drawing according to FIG. 6;

FIG. 8 is a perspective view of the roller of the regulating member;

FIG. 9 a–c show diagrammatically a longitudinal progressive contraction followed by an expansion in the hose according to the invention;

FIG. 10 illustrates the cooperation between the bellows and the regulating member;

FIG. 11 represents a pneumatic milking machine comprising teat cups according to the invention.

DESCRIPTION OF A PREFERRED EMBODIMENT

Figure 3:
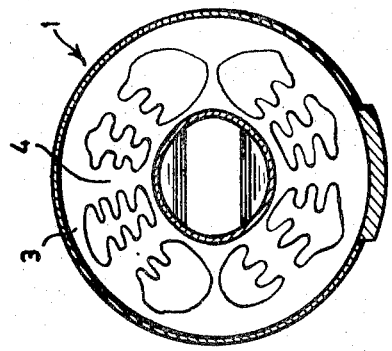
FIG. 2 and 3 are longitudinal sections on the lines II—II and III—III in FIG. 1.
Figure 2:
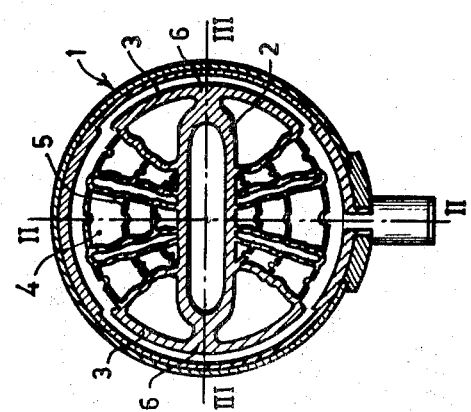
Figure 1:
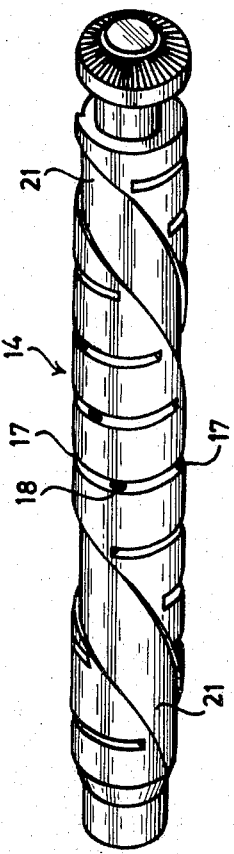
FIG. 1 is a cross section of the hose according to the line I—I in FIG. 2, the hose being applied as a lining for a teat cup.

As is best seen in the FIGS. 1–3 the hose 1 consists of an inner wall 2 and an outer wall 3. The inner wall 2 has a rounded rectangular cross section and the outer wall 3 is substantially cylindrical. Between the two walls are force exerting members 4 which are axially spaced. These elements 4 consist of bellows which on the one hand are connected with the outer side of the inner wall 2 and particularly along the long rectangular sides of this wall (see FIG. 1).

The bellows 4 are constructed from sectors provided with intermediate partitions 5 to prevent the bellows from being entirely flattened. The inner wall 2 is connected, along the short sides of the rectangle, at 6 with the outer wall 3.

The outer wall 3 is slightly scalloped as is best seen in FIG. 3 in order to enhance the deformability. The assembly of inner wall 2, outer wall 3 and bellows 4 constitute the hose according to the invention. In the depicted embodiment this hose is provided at its left end in the FIGS. 2 and 3 with a connection for a milk pipe 7 (see FIG. 11) leading to a distribution member 8 with a connection 9 to the milk reservoir 10 and a pipe 11 leading to a source of vacuum (not shown).

Rightwards in the FIGS. 2 and 3 the hose 1 has a sealing edge 12 which can be pressed against the udder of a cow. The teat of the cow is then lying in the inner space of the inner wall 2 of the hose.

The bellows 4 can be connected with the source of vacuum or with the atmosphere via a regulating member 13. This member consists of a hollow cylindrical roller 14 (see the FIGS. 6–8) which is rotatably disposed in a housing 15 of a teat cup 16. The roller 14 is provided with a plurality of equidistantly spaced annular grooves 17 extending along the outer circumference through an angle of arc of less than 330°. As is best seen in the FIGS. 10 and 11 the angle of arc is about 300° in this case. These grooves 17 communicate via one or more bores 18 with the hollow interior 19 of the roller 14. On the other hand the grooves 17 can, via a passage 20 (FIG. 2) in the housing 15 of the teat cup 16, communicate with the bellow 4 concerned.

The angular position of the consecutive grooves 17 in the roller 14 is always staggered in such a way that there is a helical area along the outer circumference of the roller, in which area a recess in the shape of a gutter 21 is formed. This gutter communicates via an opening 22 in the housing 15, permanently with the atmosphere. The grooves 17 have a depth which goes from minimum to a maximum value as is best seen in FIG.

10. In operation the roller 14 is rotated for which purpose a drive 23 can be mounted consisting of a pneumatic motor with a worm wheel reduction device, see FIG. 6 and 7; this provision will not be discussed here.

The device so far described aims to achieve a longitudinally progressing contraction followed by an expansion in the hose 1 and particularly in the inner wall 2 of the described double-walled construction. In the situation of rest the hose 1 has a shape as depicted in the FIGS. 1–4. The inner wall 2 shows then a narrow rounded-rectangular cross section which corresponds with the situation of contraction.

The situation aimed at in operation is diagrammatically represented in FIG. 9. In the Figure are depicted some progressive contractions A followed and preceded by an expansion B. The contractions A move in FIG. 9 in a downward direction, like the expansions B. In order to achieve these expansions B the bellows 4 concerned are, via the regulating member 13, connected with a source of vacuum.

In FIG. 6 is depicted a particular situation which corresponds with the situation in FIG. 9c. In the area B the inner wall 2 of the hose is deformed in such a way that the short principal axis of the original rectangular cross section increases and the original long pricipal axis decreases, whereby the situation depicted in FIG. 5 arises.

Figure 4:
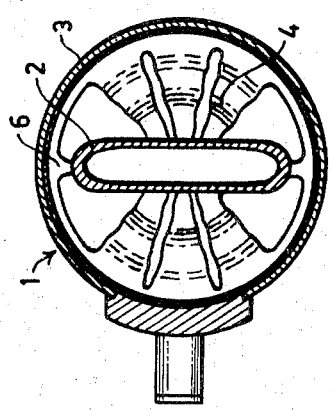
FIG. 4 is a cross section on the line IV—IV in FIG. 3.

The cross section of the inner wall 3 takes then almost a circular configuration with a diameter which is about half the sum of the two principal axes of the rectangular cross section in the FIGS. 1 and 4.

In the areas between the expansion B and the contraction A the inner wall 2 has the configuration of a bridge part, which depends on the extent to which the vacuum is created within the bellows 4. As is visible in FIG. 9 each contraction A is followed by a gradual expansion. This is achieved due to the gradual increasing depth of the grooves 17 in the roller 14. During the rotation of this roller the passage 20 is connected to the progressively deeper part of the groove 17, so that the vacuum gradually increases in the associated bellow 4.

After a maximum value of the expansion B has been exceeded the gutter comes to lie in front of the passage 20, so that a fast contraction (rebound) follows which is visible in the FIGS. 6 and 9, while FIG. 10 illustrates this phenomenon, further. The number of bellows involved in a contraction and an expansion is seven.

Five are connected with the source of vacuum (leftwards of B) and two with the atmosphere (rightwards of B).

The asymmetric shape of the "wavy motion" contributes to the improvement of the thrust effect. This applies particularly to an embodiment (not shown here) in which the bellows are arranged around the hose (not on two sides). The contraction and expansion is produced on the entire circumference, of the hose so that a peristaltic movement is obtained.

In the embodiment depicted in the drawing the hose is destined as a lining for a teat cup. The teat of the cow to be milked is introduced into the interior of the inner wall 2 of the hose 1, after this hose has been expanded throughout its length, that is to say brought into the form of cross section of which is shown in FIG. 5.

This can be achieved by connecting the opening 22 with the source of vacuum in the core 19 of the roller 14. So all (12) bellows have been flattened and the entire inner wall 2 has taken the configuration of an expansion B.

After four of such teat cups 16 have been applied (see FIG. 11) two vacuum levels become effective. The one level, corresponding to a small underpressure ranging from 1.5 to 4 inch mercury column, is connected with the milk reservoir 10, the distributor 8 and the pipe 7.

As a consequence the sealing edge 12 of the hose of the teat cup will adhere by suction to the wall of the cow's udder. The other level representing a greater underpressure in the range of 14 to 16 inch mercury column is connected with the pipe 11 leading to the regulating members 13 of the various teat cups. When now the driving means 23 are put into operation, the inner wall 2 of the hose 1 in each teat cup 16 will undergo a progressing deformation effecting a very natural milk drawing process. From the root of the teat the milk channel is squeezed together, which contraction is continued toward the end of the teat.

An important advantage of the hose according to the invention when applied as a lining for a teat cup consists in the exertion of a "squeezing movement" (that is to say a pressure is exerted from two sides) which has resemblance to the milking by hand. The tissue of the teat can escape in the area of contraction A which is advantageous with respect to the mechanical load applied to the teat. This holds particularly when the invention is compared with the classic pneumatic milking methods.

The teat cup according to the invention allows to perform a more natural milking method, which is due to the fact that the teats are exposed to a massaging effect. A very minor vacuum need only be applied to the teat itself, viz. about 2 inch column of mercury, serving to prevent the teat cups from falling off. The sanitary condition of the udder is promoted and after the cow has been milked dry the milking machine need not be directly stopped.

What I claim is:

1. A hose of elastically deformable material with force exerting members arranged all round the hose and axially spaced for achieving a longitudinally progressive contraction followed by a spaced and longitudinally progressive expansion, the force exerting members consisting of bellows connected with the hose, and regulating means progressively communicating said bellows with a source of vacuum and with the atmosphere.

2. A hose according to claim 1, particularly destined as a lining in a teat cup for a pneumatic milking device, characterized in that a wall of the hose has a narrow rounded rectangular cross section, and in that the bellows are constructed from sectors disposed on the outer surfaces of the long sides of the rectangular cross section.

3. A teat cup provided with a lining in conformity with the hose according to claim 2, characterized in that the hose has a cylindrical outer wall surrounding the rectangular wall, while the inner wall along the short rectangular sides is connected with the outer wall and the bellows are lying between the rectangular and the outer wall.

4. A hose of elastically deformable material with force exerting members arranged all around the hose and axially spaced for achieving a longitudinally progressive contraction followed by an expansion, said hose being double-walled with a cylindrical outer wall and a rectangular inner wall, said inner wall along the short rectangular side thereof being connected with said outer wall, said force exerting members consisting of bellows constructed from sectors disposed on the outer wall of the long side of said rectangular wall and between the inner and outer wall, and regulating means being provided capable of connecting the bellows with a source of vacuum or with the atmosphere, said regulating means consisting of a hollow cylindrical roller which is rotatably mounted in the housing of the teat cup, the roller being provided with a plurality of equidistantly spaced annular grooves extending along the outer circumference through an angle of arc of less than 330°, the grooves communicating on the one hand via one or more bores with the hollow core of the roller and on the other hand, via passages in the housing of the teat cup, with the bellow concerned.

5. A teat cup according to claim 4, characterized in that the angular position of the consecutive grooves in the roller is always staggered in such a way that there is a helical area along the outer circumference of the roller which is recessed so as to form a gutter.

6. A teat cup according to claim 4, characterized in that the grooves have a depth increasing from a minimum to a maximum.

* * * * *